(12) United States Patent
Fish et al.

(10) Patent No.: US 7,765,808 B2
(45) Date of Patent: Aug. 3, 2010

(54) OPTIMIZED INTERNAL MANIFOLD HEAT SHIELD ATTACHMENT

(75) Inventors: Jason Fish, Brampton (CA); Bhawan B. Patel, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 981 days.

(21) Appl. No.: 11/466,137

(22) Filed: Aug. 22, 2006

(65) Prior Publication Data

US 2008/0047274 A1 Feb. 28, 2008

(51) Int. Cl.
*F02C 1/00* (2006.01)
*F02G 3/00* (2006.01)

(52) U.S. Cl. .......................................... 60/739; 60/734

(58) Field of Classification Search .................... 60/739, 60/734, 746, 747, 776
See application file for complete search history.

(56) References Cited

U.S. PATENT DOCUMENTS

| 2,151,540 A | 3/1939 | Varga |
| 2,946,185 A | 7/1960 | Bayer |
| 3,213,523 A | 10/1965 | Boehler |
| 3,472,025 A | 10/1969 | Simmons et al. |
| 4,100,733 A | 7/1978 | Streibel et al. |
| 4,322,945 A | 4/1982 | Peterson et al. |
| 4,327,547 A | 5/1982 | Hughes et al. |
| 4,404,806 A | 9/1983 | Bell, III et al. |
| 4,483,137 A | 11/1984 | Faulkner |
| 5,036,657 A | 8/1991 | Seto et al. |
| 5,253,471 A | 10/1993 | Richardson |
| 5,271,219 A | 12/1993 | Richardson |
| 5,396,759 A | 3/1995 | Richardson |
| 5,400,968 A | 3/1995 | Sood |
| 5,419,115 A | 5/1995 | Butler et al. |
| 5,423,178 A | 6/1995 | Mains |
| 5,570,580 A | 11/1996 | Mains |
| 5,579,645 A | 12/1996 | Prociw et al. |
| 5,598,696 A | 2/1997 | Stotts |
| 5,737,921 A | 4/1998 | Jones et al. |
| 5,771,696 A | 6/1998 | Hansel et al. |
| 5,848,525 A | 12/1998 | Spencer |
| 5,956,955 A | 9/1999 | Schmid |

(Continued)

FOREIGN PATENT DOCUMENTS

| CA | 1013153 | 7/1977 |
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

OTHER PUBLICATIONS

U.S. Appl. No. 11/220,849, Prociw et al.

(Continued)

*Primary Examiner*—Michael Cuff
*Assistant Examiner*—Andrew Nguyen
(74) *Attorney, Agent, or Firm*—Ogilvy Renault LLP

(57) ABSTRACT

A fuel manifold assembly for a gas turbine engine includes an annular fuel manifold having at least one fuel conveying passage and defining at least one slow fuel flowing location. A heat shield at least partly encloses the fuel manifold and a plurality of intermittent joints attach the heat shield to the fuel manifold. The joints are circumferentially distributed about the fuel manifold as far away from the slow flowing location as possible while maintaining the fuel manifold dynamically balanced.

14 Claims, 3 Drawing Sheets

U.S. PATENT DOCUMENTS

| | | |
|---|---|---|
| 5,983,642 A | 11/1999 | Parker et al. |
| 5,996,335 A | 12/1999 | Ebel |
| 6,109,038 A | 8/2000 | Sharifi et al. |
| 6,141,968 A | 11/2000 | Gates et al. |
| 6,149,075 A | 11/2000 | Moertle et al. |
| 6,240,732 B1 | 6/2001 | Allan |
| 6,256,995 B1 | 7/2001 | Sampath et al. |
| 6,463,739 B1 | 10/2002 | Mueller et al. |
| 6,761,035 B1 | 7/2004 | Mueller |
| 7,028,484 B2 | 4/2006 | Prociw et al. |
| 2003/0014979 A1 | 1/2003 | Summerfield et al. |
| 2005/0188699 A1 | 9/2005 | Shafique et al. |
| 2006/0156731 A1 | 7/2006 | Prociw et al. |
| 2006/0156733 A1 | 7/2006 | Prociw et al. |
| 2006/0218925 A1 | 10/2006 | Prociw et al. |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/513,030, Morenko et al.
U.S. Appl. No. 11/532,611, Rudrapatna et al.
U.S. Appl. No. 11/535,185, Morenko et al.
U.S. Appl. No. 11/534,381, Fish et al.
U.S. Appl. No. 11/552,240, Patel et al.

OPTIMIZED INTERNAL MANIFOLD HEAT SHIELD ATTACHMENT

TECHNICAL FIELD

The invention relates generally to a gas turbine engine and, more particularly to gas turbine engine fuel manifolds and methods of manufacturing same.

BACKGROUND OF THE ART

A fuel carrying member such as an internal manifold of a gas turbine engine must survive inside a hot environment while protecting the fuel flowing therein from being subjected to high temperatures. To accomplish this, a heat shield is used around the internal manifold to minimize convective heat transfer thereto. Typically, the heat shield is attached to the internal manifold by attachment points created by welding or brazing techniques. The attachment points are problematic as they act as heat input points transferring heat from the heat shield to the internal manifold. The heat shield is exposed to much higher temperatures than the internal manifold. Heat transfer occurs through the attachment points thereby causing a temperature increase in the fuel flowing in the internal manifold. Therefore, the is a need to minimize the overall heat transfer from the heat shield to the internal manifold through the attachment points.

Accordingly, improvement in the internal manifold heat shield attachment design is sought.

SUMMARY OF THE INVENTION

It is therefore an object of this invention to provide an improved internal manifold heat shield attachment design.

In one aspect, the present invention provides a fuel manifold assembly for a gas turbine engine comprising an annular fuel manifold having at least one fuel conveying passage and defining at least one slow fuel flowing location, a heat shield at least partly enclosing the fuel manifold, a plurality of intermittent joints attaching the heat shield to the fuel manifold, the joints being circumferentially distributed about the fuel manifold and located as far away as possible from the slow fuel flowing location in the fuel manifold while maintaining the fuel manifold assembly dynamically balanced.

In a second aspect, the present invention provides a fuel injection system for gas turbine engine including a compressor, a combustor and a turbine, comprising: an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold defining at least one slow fuel flowing location; an annular heat shield at least partially covering the fuel manifold about the circumference thereof, and a plurality of intermittent joints attaching the heat shield to the fuel manifold, the joints circumferentially distributed about the fuel manifold and located as far away as possible from the slow fuel flowing location in the fuel manifold while maintaining the fuel manifold assembly dynamically balanced.

In a third aspect, the present invention provides a method of minimizing heat transfer from a heat shield to an internal fuel manifold of a fuel injection system in a gas turbine, the method comprising the steps of: determining at least one slow fuel flowing location in a fuel conveying passage of the fuel manifold; selecting joint locations as far away as possible away from the slow fuel flowing location; ensuring that the fuel injection system is dynamically balanced with said selected joint locations; and joining the heat shield to the fuel manifold at said selected joint locations.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
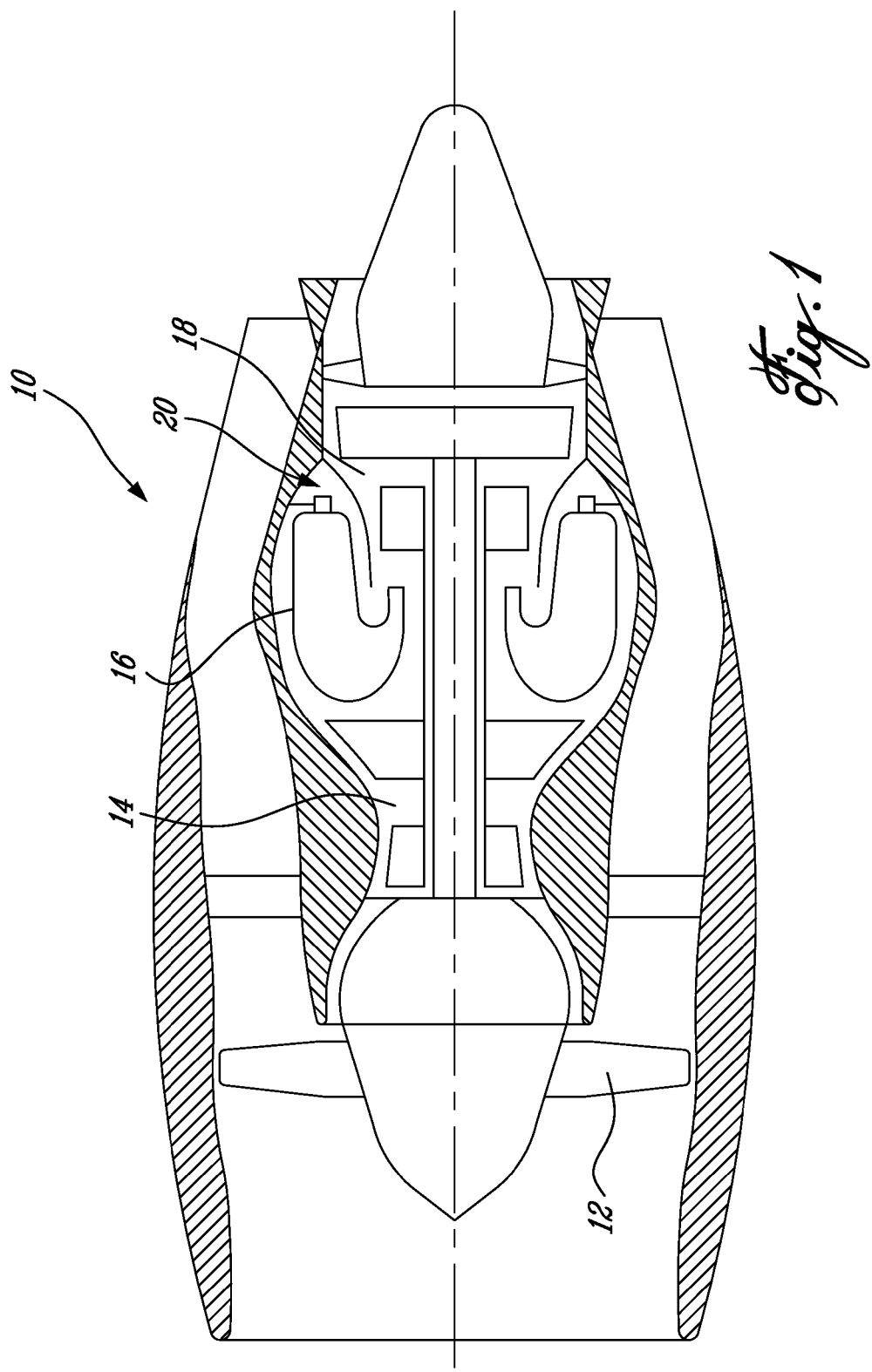
FIG. 1 is a schematic cross-sectional view of a gas turbine engine.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized, the mixture being subsequently ignited for generating hot combustion gases before passing through a turbine section 18 for extracting energy from the combustion gases.

Fuel is injected into the combustor 16 of the gas turbine engine 10 by a fuel injection system 20 which is connected in fluid flow communication with a fuel source (not shown) and is operable to inject fuel into the combustor 16 for mixing with the compressed air from the compressor 14 and ignition of the resultant mixture.

Figure 2:
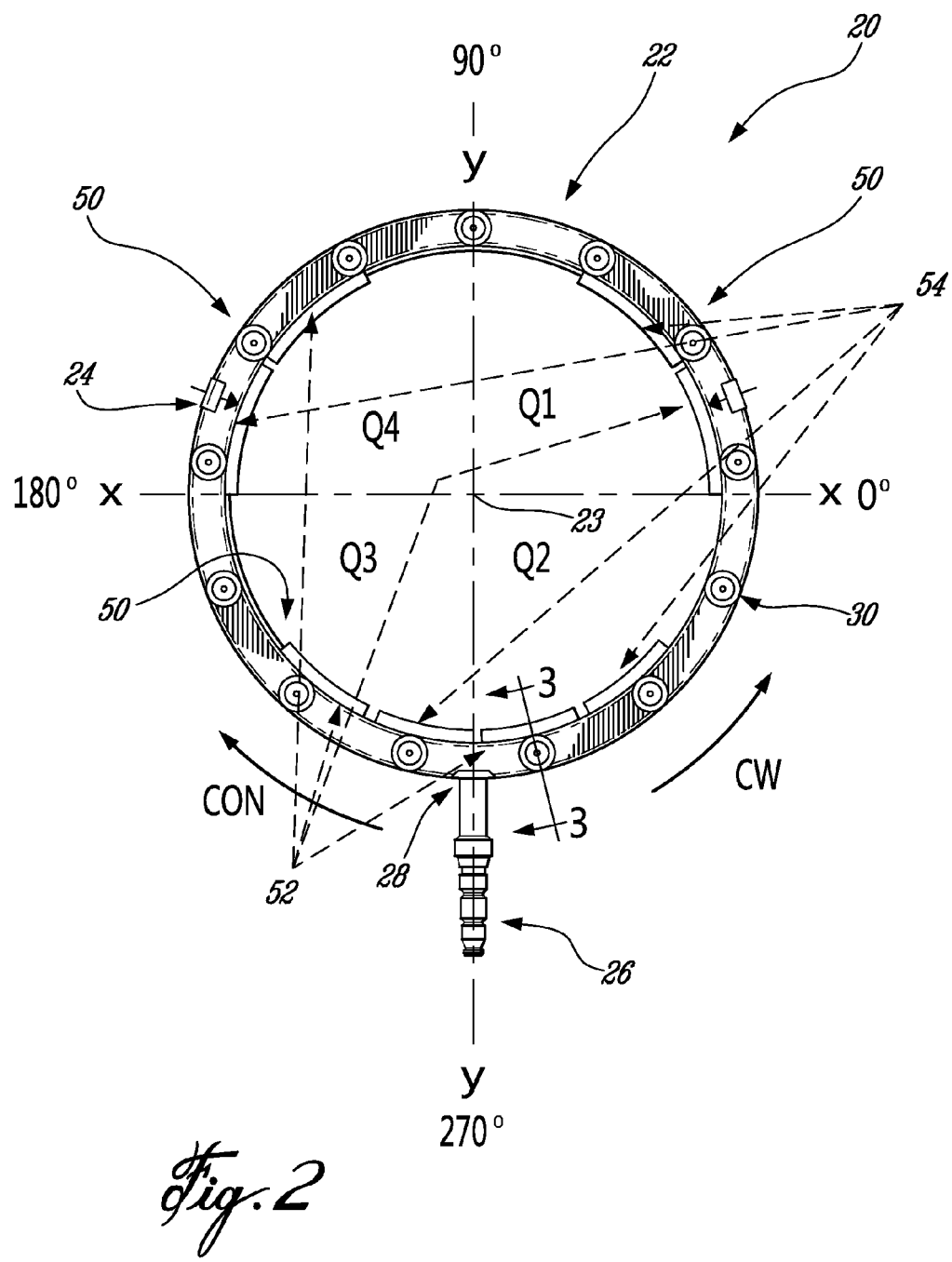
FIG. 2 is a front view of an internal fuel manifold assembly in accordance with one aspect of the present invention, for use in a gas turbine engine such as that shown in FIG. 1.
Figure 3:
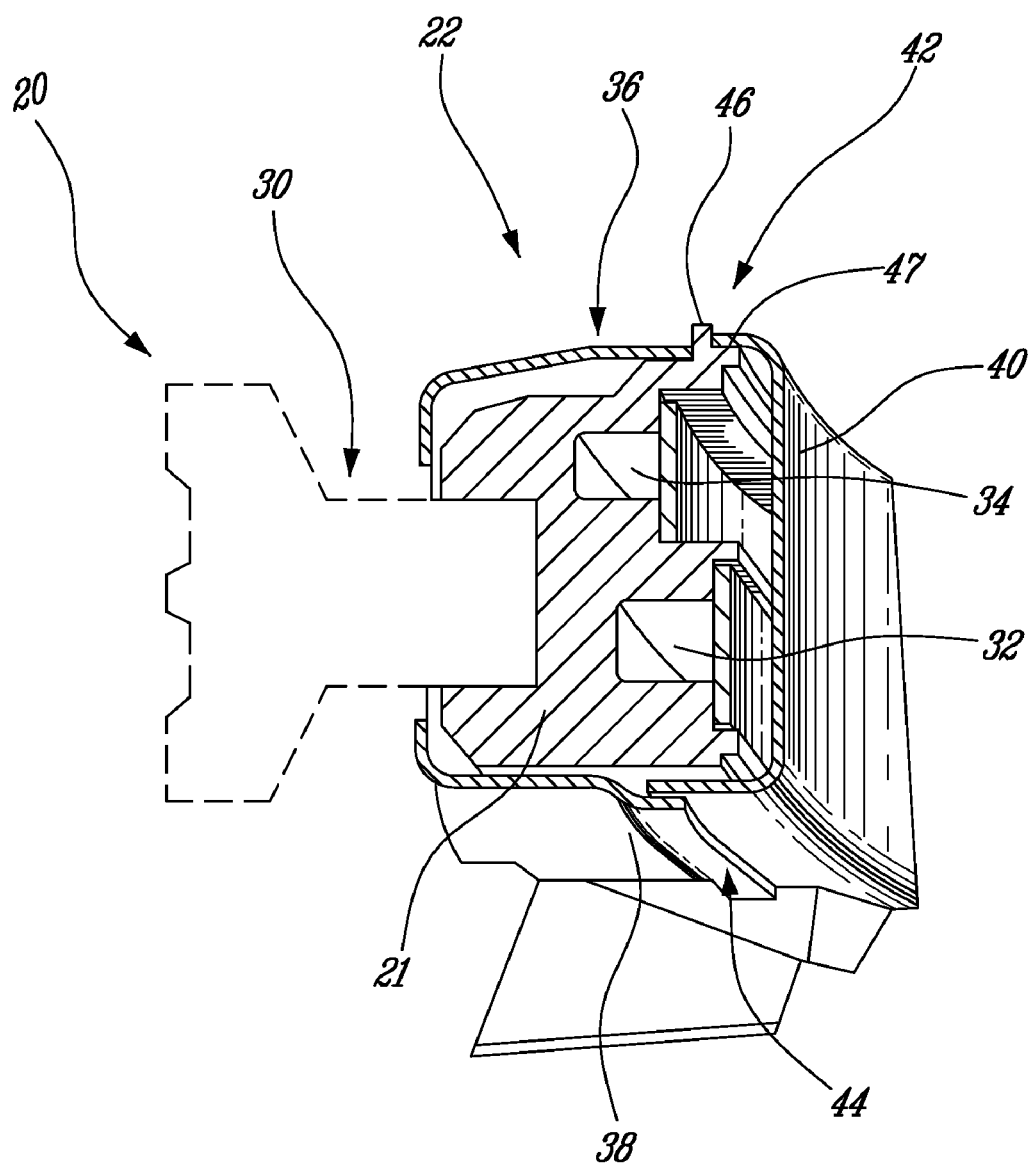
FIG. 3 is a perspective cross-sectional view of the internal fuel manifold assembly of FIG. 2, taken through line 3-3 thereof.

Referring to FIGS. 2 and 3, the fuel injection system 20 comprises at least one fuel conveying member through which fuel flows. In the exemplary embodiment, the fuel injection system 20 includes an annular internal manifold assembly 22 having a ring shape which is mounted adjacent to the combustor 16 in the gas turbine engine 10. The internal manifold assembly 22 is preferably mounted to the combustor 16 or to surrounding support structure via several integral attachment lugs 24 which receive pins (not shown) engaged to the support structure. This provides a mounting mechanism which allows for thermal expansion of the internal manifold at high temperatures.

The fuel manifold assembly 22 includes a solid fuel manifold ring 21 defining at least one fuel flow passage therein which is in fluid flow communication with a plurality of fuel nozzles 30 mounted to the fuel manifold 21. A fuel inlet pipe 26 provides fuel to the internal manifold assembly 22, via inlet 28, which then distributes the fuel supply to nozzles 30. The nozzles 30 can be directly mounted to the fuel manifold ring 21. In this particular embodiment, primary and secondary annular fuel conduits 32 and 34 (FIG. 3) permit circumferential distribution of a primary and secondary fuel supply provided through the inlet pipe 26 around the fuel manifold ring 21. The primary and secondary fuel supplies both split in two upon entering the fuel manifold ring 21 through the fuel inlet 26 and each flow in both a clockwise direction, identified by "CW" in FIG. 2, and in a counter clockwise direction, identified by "CCW" in FIG. 2, away from the fuel inlet disposed at the lowest point of the ring.

Still referring to FIG. 2, a Cartesian coordinate system having x and y axes intersecting each other at a center point 23 which is coincident with a center of the fuel manifold ring 21. Thus, the internal manifold assembly 22 is divided in four equal quadrants identified by Q1, Q2, Q3 and Q4 id FIG. 2. As the center of the Cartesian coordinate system is concentric with the center 23 of the fuel manifold ring 21, the x-axis extends along a horizontal midplane of the ring 21 and the y-axis extends along a vertical midplane of the ring 21. The Cartesian coordinate system defines a 360 degree coordinate plane wherein the positive x-axis defines 0 degree position in the plane and the positive y-axis defines the 90 degree position in the plane. The fuel inlet pipe 26 is located at 270 degrees in the Cartesian plane such that the fuel flows upwards from 270 degrees to 90 degrees about the circumference of the fuel manifold ring 21 in the CW and CCW directions as described above.

Notably, fuel flow is fastest at the inlet 28 and slowest at the top of the ring 21 defined by 90 degrees in the Cartesian plane. As the fuel flows circumferentially, feeding each nozzle 30 in its path, it decreases and/or slows down. Thus, at the nozzle 30 located at 90 degrees the fuel flow is weaker and/or slower than at the opposite end of the ring 21.

Referring concurrently to FIGS. 2 and 3, the internal manifold assembly 22 comprises an outer heat shield 36 which at least partially covers the fuel manifold ring 21 therein. Preferably, the heat shield 36 covers almost the entire inner fuel manifold 21, such as to protect it from the high temperatures of the combustor and the area surrounding the combustor in the engine.

Referring now to FIG. 3 in more detail, the outer heat shield 36 of the fuel manifold assembly 22 is provided as a two-part shield, having a front segment 38 and a rear segment 40 for enclosing the internal manifold 22 as clearly shown in FIG. 3. The front and rear segments 38 and 40 meet each other and/or the mounting point on the fuel manifold ring 21 about an inner and outer diameter 42 and 44 thereof. However, in an alternate embodiment the heat shield 36 may be in fact composed of a single component, provide installation thereof onto the fuel manifold 21 remains possible. In the embodiment depicted in which the two-part heat shield is used, the fuel manifold ring 21 is provided with an inner circumferential lip 46 protruding radially inwardly from a circumferential surface 47 on the inner diameter 42 of the fuel manifold ring 21. The circumferential lip 46 provides a mounting point to which the front and rear heat shield segments 38 and 40 are fastened, by way of suitable method such as brazing or welding for example. As the contact between the heat shield 36 and the fuel manifold 21 is limited generally to the lip 46, the conductive heat transfer therebetween is accordingly limited. Further, as the interconnection between the heat shield and fuel manifold is limited to a relative confined area, simpler manufacturing of the assembly is possible (i.e. the welds or braze used to fasten the heat shield to the manifold are confined to a limited and relatively accessible region of the assembly).

FIG. 3 shows the front and rear heat shield segments 38 and 40 in abutting relation with the lip 46 about the inner diameter 42 of the internal manifold 22. The front and rear heat shield segments 38 and 40 overlap along the outer diameter 44 of the ring 21. Thus, the front and rear heat shield segments 38 and 40 are attached to the manifold ring 21 along the inner diameter 42 and are free to move relative to each other along the outer diameter 44 thereof. During engine operation, the front and rear segments 38 and 40 are subjected primarily to a tensile force at the outer diameter 44 of the ring thereby pulling away from each other. The opposite is the case along the inner diameter 42 of the ring 21 where the segments 38, 40 are subjected to a compression force.

Furthermore, the heat shield 36 is exposed to higher temperatures than the fuel manifold ring 21 of the internal manifold assembly 22. For example, in one exemplary embodiment, the heat shield 36 can be exposed to temperatures ranging between 700 to 800 degrees F., while the manifold ring 21 can be exposed to temperatures ranging between 300 to 400 degrees F. The location of greatest heat transfer from the heat shield 22 to the manifold ring 21 occurs through the joints therebetween. Thus, it is desirable to minimize the support required for heat shield attachment while maintaining the system dynamically balanced.

The heat shield 36 is joined to the manifold ring 21 by joints 50 as depicted in FIG. 2. Particularly, the joints 50 are intermittently disposed about the circumference of the ring 21, and more specifically on the lip 46 along the inner diameter 42. For example the joints 50 may be provided as intermittent weld connections placed in predetermined locations on the manifold ring 21. The joint configuration considers both the heat transfer which occurs through the joints 50 and the dynamics of the manifold assembly 22 in response to the location of the joints 50. The joint configuration is optimized so as to provide the minimum support required for the heat shield 36 to remain attached to the manifold ring 21 while maintaining the assembly 22 dynamically balanced during engine operation. By minimizing the joint connections, the heat input to the ring 21 is also minimized.

Still referring to FIG. 2, the joints 50 include front segment joints 52 and rear segments joints 54. Particularly, four front segment joints 52 and four rear segments joints 54 are alternately disposed about the ring 21, and are disposed as far away as possible from the top of the ring 21 (i.e. at the 90 degree position in the Cartesian plane) while maintaining the manifold assembly 22 dynamically balanced. By locating the joints 50 away from the slowest fuel flow location, heat transfer concerns are addressed as the fuel flowing at a higher speed can accept more heat input.

Thus, half of the front segment joints 52 and half of the rear segment joints 54 are located below the x-axis and the other half of the joints thereof are located above the x-axis. In greater detail, both a front segment joint 52 and a rear segment joint 54 are located in each of the four quadrants Q1, Q2, Q3 and Q4 in alternating relation. Still further, the joints 52 and 54 located in the bottom half of the manifold ring 21 in quadrants Q2 and Q3 are positioned directly adjacent the inlet 28 in alternating relation. The joints 52 and 54 located in the top half of the manifold ring 21 in quadrants Q1 and Q4 respectively are positioned immediately adjacent the x-axis, in alternating relation with each other and with the joints 52, 54 in the bottom half. Therefore, it can be seen that the joints 50 within each quadrant are positioned as far away as possible from the location of slowest fuel flow in the manifold ring 21, which is defined at 90 degrees in the present embodiment, while still maintaining the manifold assembly 22 dynamically balanced.

Furthermore, it can be seen that the joint configuration of alternating front and rear segment joints 52 and 54 of the right half of the manifold assembly 22 defining quadrants Q1 and Q2, is not a mirror image of the joint configuration of the left half of the manifold assembly 22 defining quadrants Q3 and Q4. Similarly the joint configuration of top half of the manifold assembly 22 defining quadrants Q1 and Q4 is not a mirror image of the joint configuration of the bottom half of the manifold assembly 22 defining quadrants Q2 and Q3.

Notably, the joints 50 are provided as front segment joints 52 and rear segments joints 54 primarily for manufacturability purposes. This is due to the fact that the lip 46 is designed such that it can only accept a single weld as it is at least partially eaten away during the welding process. Hence, welding both the front and rear segments 38 and 40 to the manifold ring 21 at the same location would entail welding a weld to a weld which is undesirable. Still further, limiting the overall number of welds is also desirable for manufacturability purposes.

The above description is meant to be exemplary only, and one skilled in the art will recognize that changes may be made to the embodiments described without department from the scope of the invention disclosed. For example, the number of joints attaching the heat shield to the manifold ring can vary as can the location of slowest fuel flow in the manifold ring. Still other modifications which fall within the scope of the present invention will be apparent to those skilled in the art, in light of a review of this disclosure, and such modifications are intended to fall within the appended claims.

What is claimed is:

1. A fuel manifold assembly for a gas turbine engine comprising an annular fuel manifold having at least one circumferential fuel conveying passage in fluid flow communication with a fuel inlet to the fuel manifold, the fuel conveying passage defining at least one slow fuel flowing location disposed diametrically opposite to said inlet, a heat shield at least partly enclosing the fuel manifold, the heat shield comprising a front segment and a rear segment axially aft of the front segment, the front and rear heat shield segments being independently attached to the fuel manifold by front segment joints and rear segment joints respectively, the front segment joints and the rear segment joints being disposed in alternating relation about a circumference of the fuel manifold, the fuel manifold defining four equal quadrants with a center point coincident with a center of the annular fuel manifold, the slow fuel flowing location being located between a first two of the quadrants and the fuel inlet being located between a remaining two of the quadrants, and wherein one or more of the front segment joints and one or more of the rear segment joints are disposed in each of said four quadrants at circumferentially adjacent locations furthest from said slow fuel flowing location within each said quadrant.

2. The fuel manifold assembly as defined in claim 1, wherein the fuel manifold defines a first and a second half, and wherein half of the front segment joints and half of the rear segment joints are disposed in the first half of the fuel manifold and the other half of the front segment joints and the other half of the rear segment joints are disposed in the second half of the fuel manifold.

3. The fuel manifold assembly as defined in claim 2, comprising four front segment joints and four rear segment joints.

4. The fuel manifold assembly as defined in claim 1, wherein the four equal quadrants each have a mirror image differing from each other.

5. The fuel manifold assembly as defined in claim 4, wherein the fuel manifold is defined by a Cartesian coordinate system having an intersecting x-axis and y-axis with an origin concentric with a center of the fuel manifold, the Cartesian coordinate system defining a 360 degree plane, and wherein the slow fuel flowing location is at 90 degrees, the front and rear segment joints are located end to end immediately adjacent corresponding 0, 180 and 270 degree positions.

6. The fuel manifold assembly as defined in claim 1, wherein the fuel manifold comprises a circumferential lip for supporting the joints.

7. A fuel injection system for gas turbine engine including a compressor, a combustor and a turbine, comprising:

an annular internal fuel manifold disposed adjacent the combustor within a surrounding engine casing, the fuel manifold having at least one fuel conveying passage therein in fluid flow communication with a plurality of fuel injection nozzles disposed along the fuel manifold and adapted to spray fuel into the combustor, and a fuel inlet connected to the fuel manifold and providing fuel flow to the fuel conveying passage, the fuel manifold defining at least one slow fuel flowing location, the fuel manifold defining four equal quadrants and the slow fuel flowing location being located between two of the quadrants;

an annular heat shield at least partially covering the fuel manifold about the circumference thereof, the heat shield including a front segment and a rear segment, the rear segment being axially aft of the front segment; and a plurality of intermittent joints attaching the heat shield to the fuel manifold, the plurality of intermittent joints including front segment joints and rear segment joints respectively attaching the front segments and the rear segments of the heat shield, the front segment joints and rear segment joints being circumferentially distributed about the fuel manifold in alternating relation and wherein one or more of the front segment joints and one or more of the rear segment joints are disposed in each of the four equal quadrants at circumferentially adjacent locations furthest from said slow fuel flowing location within each said quadrant.

8. The fuel manifold assembly as defined in claim 7, wherein the fuel manifold defines a first and a second half, and wherein half of the front segment joints and half of the rear segment joints are disposed in the first half of the fuel manifold and the other half of the front segment joints and the other half of the rear segment joints are disposed in the second half of the fuel manifold.

9. The fuel manifold assembly as defined in claim 8, comprising four front segment joints and four rear segment joints.

10. The fuel manifold assembly as defined in claim 7, wherein the four equal quadrants each have a mirror image differing from each other.

11. The fuel manifold assembly as defined in claim 10, wherein the fuel manifold is defined by a Cartesian coordinate system having an intersecting x-axis and y-axis with an origin concentric with a center of the fuel manifold, the Cartesian coordinate system defining a 360 degree plane and wherein the slow fuel flowing location is at 90 degrees, the front and rear segment joints are located end to end immediately adjacent corresponding 0, 180 and 270 degree positions.

12. The fuel manifold assembly as defined in claim 11, wherein the fuel manifold comprises a circumferential lip for supporting the joints.

13. A method of minimizing heat transfer from a heat shield to an internal fuel manifold of a fuel injection system in a gas turbine, the heat shield including a front segment and a rear segment axially aft of the front segment, the fuel manifold defining four equal quadrants, the method comprising the steps of: determining at least one slow fuel flowing location in a fuel conveying passage of the fuel manifold, the slow fuel flowing location being located between two of the quadrants; selecting joint locations as far away as possible from the slow fuel flowing location within each said quadrant; ensuring that the fuel injection system is -dynamically balanced with said selected joint locations; and joining the heat shield to the fuel manifold at said selected joint locations by joining the front and the rear segments independently in a alternating relation about the circumference of the fuel manifold.

14. The method as defined in claim 13, further comprising determining a minimum amount of support required for attachment of the heat shield to the fuel manifold, and selecting a minimum number of said joint locations to yield the minimum amount of support required.

* * * * *